United States Patent
Lee et al.

(10) Patent No.: US 10,261,950 B2
(45) Date of Patent: Apr. 16, 2019

(54) TABLE AS QUERY LANGUAGE PARAMETER

(71) Applicants: Yong Sik Lee, Seoul (KR); Yaeyoung Choi, Seoul (KR); Jin Young Kook, Seoul (KR); Jochen Becker, Haseluenne (DE); Alexander Boehm, Sandhausen (DE)

(72) Inventors: Yong Sik Lee, Seoul (KR); Yaeyoung Choi, Seoul (KR); Jin Young Kook, Seoul (KR); Jochen Becker, Haseluenne (DE); Alexander Boehm, Sandhausen (DE)

(73) Assignee: SAP SE, Walldorf (DE)

(*) Notice: Subject to any disclaimer, the term of this patent is extended or adjusted under 35 U.S.C. 154(b) by 1533 days.

(21) Appl. No.: 14/090,137

(22) Filed: Nov. 26, 2013

(65) Prior Publication Data
US 2015/0149481 A1    May 28, 2015

(51) Int. Cl.
*G06F 16/2455* (2019.01)
*G06F 17/30* (2006.01)

(52) U.S. Cl.
CPC .............................. *G06F 16/24553* (2019.01)

(58) Field of Classification Search
CPC ........... G06F 17/30404; G06F 17/3041; G06F 17/30669; G06F 17/30834; G06F 17/30483
USPC ....................................................... 707/747
See application file for complete search history.

(56) References Cited

U.S. PATENT DOCUMENTS

| | | | |
|---|---|---|---|
| 9,418,085 B1* | 8/2016 | Shih ................... | G06F 17/30292 |
| 2006/0218123 A1* | 9/2006 | Chowdhuri ........ | G06F 17/30445 |
| 2012/0124045 A1* | 5/2012 | Pendap .............. | G06F 17/30486 |
| | | | 707/737 |
| 2015/0088822 A1* | 3/2015 | Raja ................... | G06F 17/30324 |
| | | | 707/625 |
| 2015/0088830 A1* | 3/2015 | Kamp ............... | G06F 17/30377 |
| | | | 707/648 |
| 2015/0089134 A1* | 3/2015 | Mukherjee .............. | G06F 15/78 |
| | | | 711/114 |
| 2015/0120745 A1* | 4/2015 | James ................ | G06F 17/30306 |
| | | | 707/741 |
| 2015/0149472 A1* | 5/2015 | Lee ...................... | G06F 17/3033 |
| | | | 707/741 |

* cited by examiner

*Primary Examiner* — Hosain T Alam
*Assistant Examiner* — Saba Ahmed
(74) *Attorney, Agent, or Firm* — Buckley, Maschoff & Talwalkar LLC

(57) ABSTRACT

A system includes generation of a query to retrieve, from a first database table, a result set conforming to query parameters for all entries of a second table stored in a volatile memory of a query client, serialization of the second table into the volatile memory, copying of the serialized second table into a second volatile memory of a data server, de-serialization of the serialized second table into the second volatile memory, determination of a plurality of entries of the first database table which are associated with the second table, and determination of the result set from the plurality of entries based on the query parameters.

6 Claims, 8 Drawing Sheets

TABLE AS QUERY LANGUAGE PARAMETER

BACKGROUND

Conventional database management systems receive queries from client applications and provide a result set to the client applications in response. Such queries typically conform to a query language (e.g., Structured Query Language (SQL)), and specify a data source (e.g., database table) and parameters describing the data to be included in the result set.

Occasionally it is desirable for the parameters to include tabular data. FIG. 1 illustrates an example of a conventional system for consuming such parameters. As shown, an example Query Client may include an Advanced Business Application Programming (ABAP) kernel, a Database Interface/Database Shared Library and an SQL Database Connector. The ABAP kernel includes an internal table (itab) stored in volatile memory (e.g., Random Access Memory) and which describes data to be included in a result set.

In one example, the ABAP kernel may begin with a query: 1*SELECT <result> FROM <table> FOR ALL ENTRIES IN itab WHERE . . . <col> <op> <itab_comp> . . . . In order to process the query, the ABAP kernel dissasembles the tabular itab into scalar values and passes these values to the DBI/DBSL as Query Parameters. After further processing by the SQLDBC, the resulting SQL statement generally appears as: N*SELECT <result> FROM <table> WHERE (col1, . . . , colM) IN (il1, . . . , iln), . . . ), and is passed to a Receive Buffer of a Data Server.

An SQL layer of the Data Server reconstructs the tabular data from the Query Parameters and an Engine executes the query using the reconstructed tabular data. As shown, execution of the query by the Engine of the Data Server requires an m*n search of the Target Table. Moreover, since the query was divided into N statements, the ABAP kernel performs up to N rows DISTINCT handling.

Systems are desired to efficiently incorporate tabular data into query parameters.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
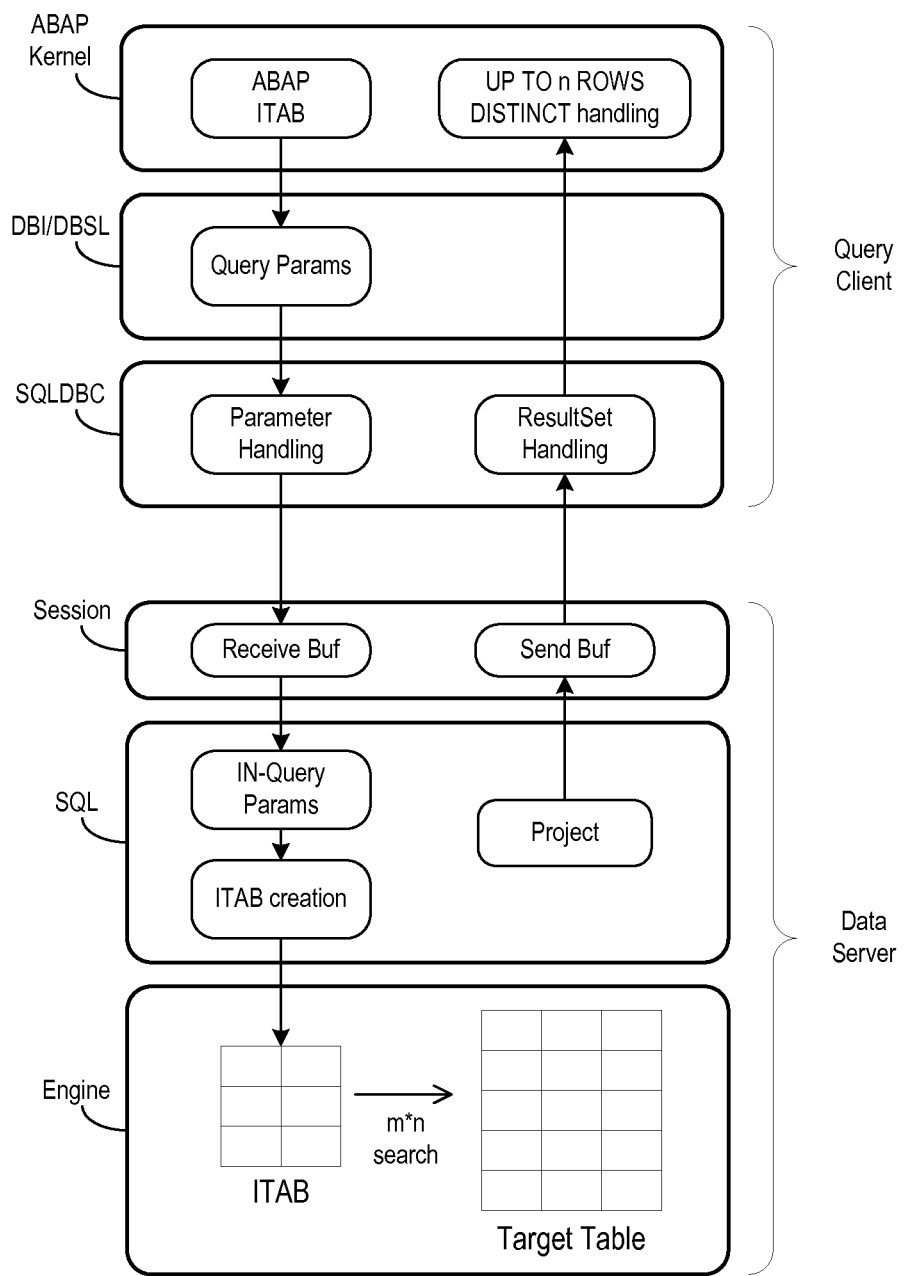
FIG. 1 is a block diagram of a query-responsive client/server system.
Figure 2:
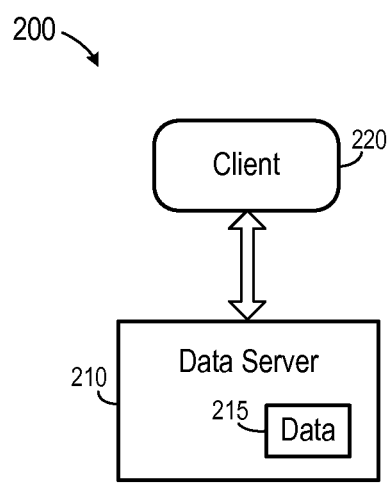
FIG. 2 is a block diagram of a system according to some embodiments.

FIG. 2 is a block diagram of system 200 according to some embodiments. System 200 includes data server 210 and client 220. Generally, data server 210 receives queries from client 220 and provides results thereto based on data of data 215. Data server 210 may support multi-tenancy for multiple unrelated clients by providing multiple logical database systems which are programmatically isolated from one another.

Data 215 may be stored in Random Access Memory (e.g., cache memory for storing recently-used data) and one or more fixed disks (e.g., persistent memory for storing their respective portions of the full database). Alternatively, data server 210 may implement an "in-memory" database, in which data 215 is a full database stored in volatile (e.g., non-disk-based) memory (e.g., Random Access Memory).

In some embodiments, data 215 may comprise one or more of conventional tabular data, row-based data, column-based data, and object-based data. Moreover, data 215 of data server 210 may be indexed and/or selectively replicated in an index to allow fast searching and retrieval thereof.

Client 220 may comprise one or more devices executing program code of a software application to provide interaction with data server 210. Client 220 may comprise an application server which receives input (e.g., requests for data, reports, forecasts, etc.) from a user, generates corresponding queries, forwards the queries to data server 210, receives results therefrom, processes the results (if needed), and provides the results to the user. Client 220 may therefore provide user interfaces to a user device (not shown) in order to receive input from and transmit data to such users.

Figure 3:
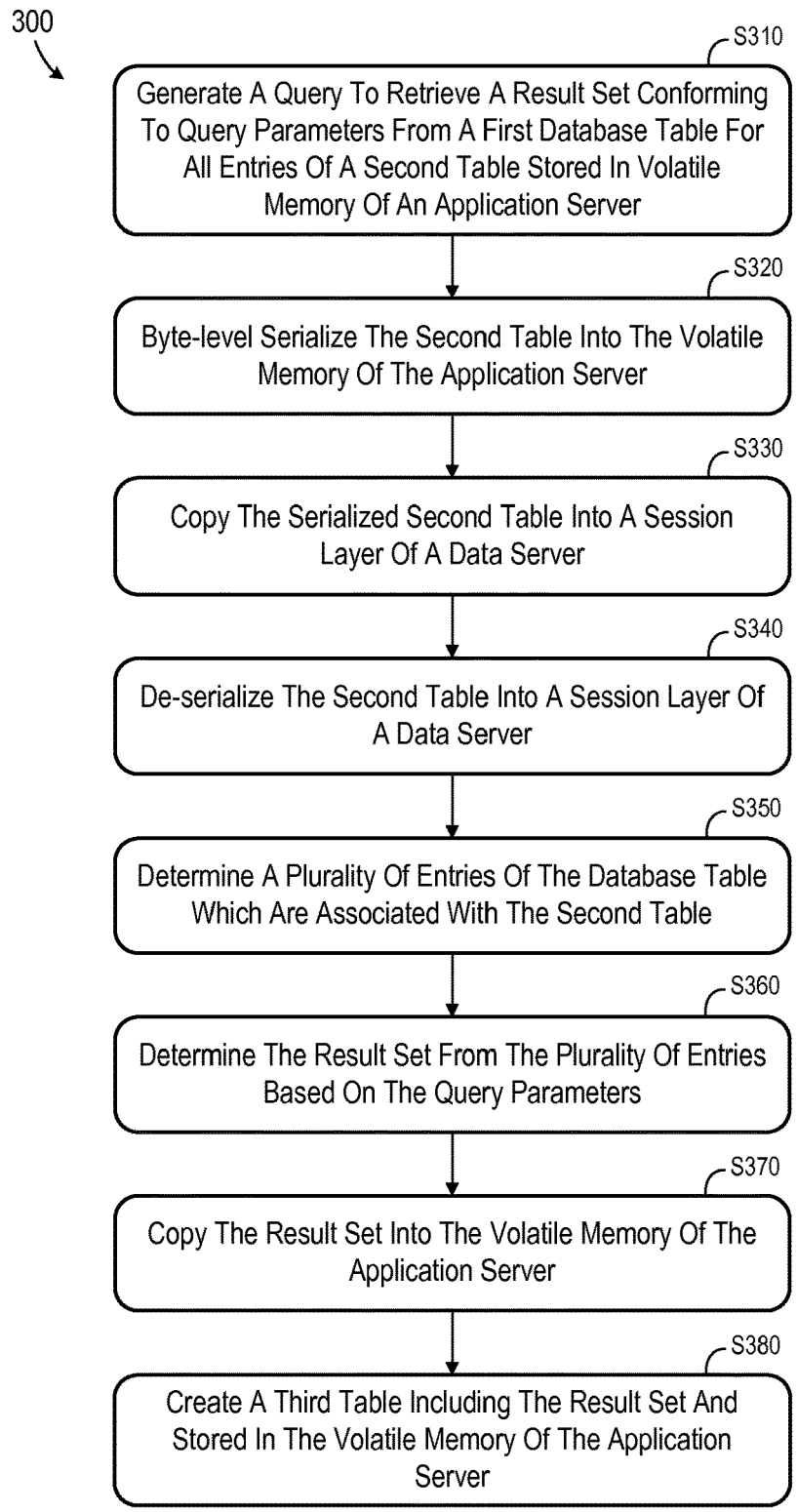
FIG. 3 is a flow diagram of a process according to some embodiments.

FIG. 3 comprises a flow diagram of process 300 according to some embodiments. In some embodiments, various hardware elements of client 220 and data server 210 execute program code to perform process 300. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a query is generated at S310. The query is to retrieve a result set conforming to query parameters from a first database table, for all entries of a second table stored in volatile memory of an application server.

Figure 4:
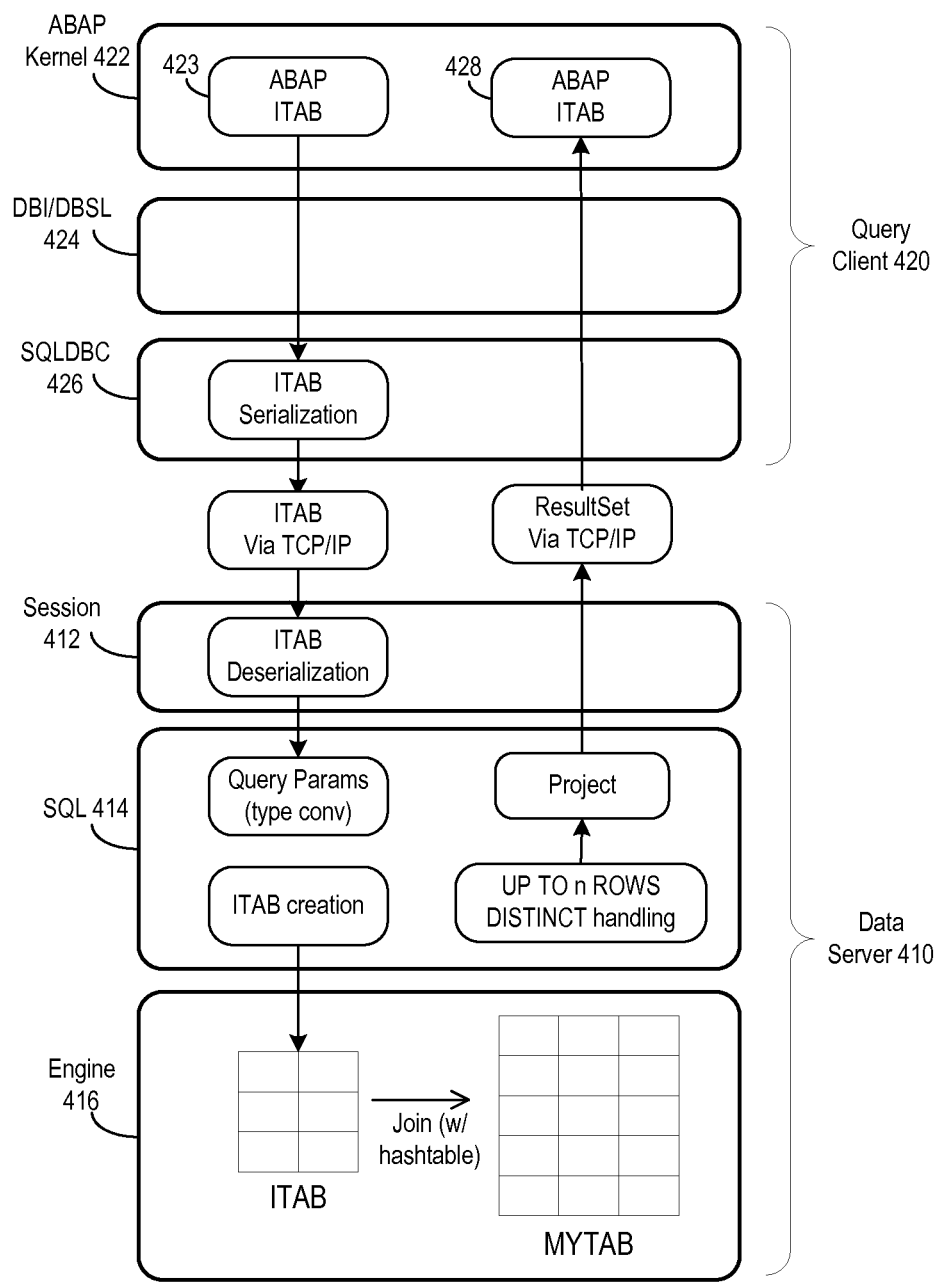
FIG. 4 is a block diagram of a query-responsive system according to some embodiments.

FIG. 4 illustrates an example of system 400 according to some embodiments, and for purposes of providing an example of process 300. System 400 may be implemented, for example, by data server 210 and client 220 of system 200, but embodiments are not limited thereto.

ABAP kernel 401 of query client 420 includes ABAP itab 423. Itab 423 includes rows of data, is stored in volatile memory (e.g., RAM) query client 420, and is defined by metadata. Itab 423 is a dynamic data object according to ABAP principles, but embodiments are not limited thereto. The query generated at S310 is to retrieve a result set conforming to query parameters from a database table, for all entries of itab 423.

Conventional query languages do not provide a persistent metadata object for a table input parameter. Accordingly, the query generated at S310 may provide metadata information (e.g., column name and data type) of the second table. Some embodiments utilize one of the two following options for providing such metadata information within the generated query:

Option A (after table parameter): ? /*itab*/(A [INT], B [VARCHAR(20)]) [AS] T2/*alias*/
Option B (before table parameter): TABLE (A [INT], B [VARCHAR(20)]) ?/*itab*/[AS] T2/*alias*/
Option A provides compactness and similarity to an INSERT-statement, while Option B provides similarity to a RETURN clause of a user-defined function.

Examples of Option A and Option B utilizing syntax similar to OpenSQL's "FOR ALL ENTRIES", in which mytab is a database table stored in data server 410:
Option A: SELECT a, b, c FROM mytab FOR ALL ENTRIES IN TABLE (A, B) ? T2 WHERE a=T2.a AND b=T2.b AND c>1000.
Option B: SELECT a, b, c FROM mytab FOR ALL ENTRIES IN ? (A, B) T2 WHERE a=T2.a AND b=T2.b AND c>1000.

Alternatively, using JOIN syntax:
Option A: SELECT DISTINCT <select-list> FROM mytab T1 JOIN TABLE (A, B) ? T2 ON T1.a=T2.a.
Option B: SELECT DISTINCT <select-list> FROM mytab T1 JOIN ? (A, B) T2 ON T1.a=T2.a.

According to some embodiments, the query conforms to the following syntax:
SELECT <select-list> FROM ? [AS] <alias name> (<column spec>). Using this syntax, the above examples would be written as:
SELECT DISTINCT <select-list> FROM mytab T1 JOIN ? [AS] T2 (A VARCHAR (10), B INT) ON T1.a=T2.a In response to the query, the second table (i.e., itab 423) is serialized at byte-level into volatile memory of the application server. The serialization is depicted in FIG. 4 within SQLDBC 426 of query client 420. It is noted that the serialization at S320 is different from dissasembly of the second table into scalar values and creation of a new query including the scalar values as described in the present Background. In the latter case, the new query including the scalar values is typically significantly longer than queries according to some embodiments.

Next, at S330, the serialized table is copied into a session layer of a data server. According to some embodiments, S330 includes copying binary data from a memory layer of query client 420 into session layer 412 of data server 410 via TCP/IP.

The table is deserialized within the session layer at S340 and used at S350 to determine a plurality of entries of the database table (i.e., mytab) which are associated with the deserialized table (i.e., itab). A detailed example of S350 according to some embodiments will be described below. Embodiments are not limited to this example. The result set is then determined at S360 from the plurality of entries based on the query parameters received at S310, as is known in the art.

The result set is copied into volatile memory of the application server at S370. According to some embodiments, a second table 428 is created at S380, which includes the result set and is stored in the volatile memory of the application server.

Figure 5A:
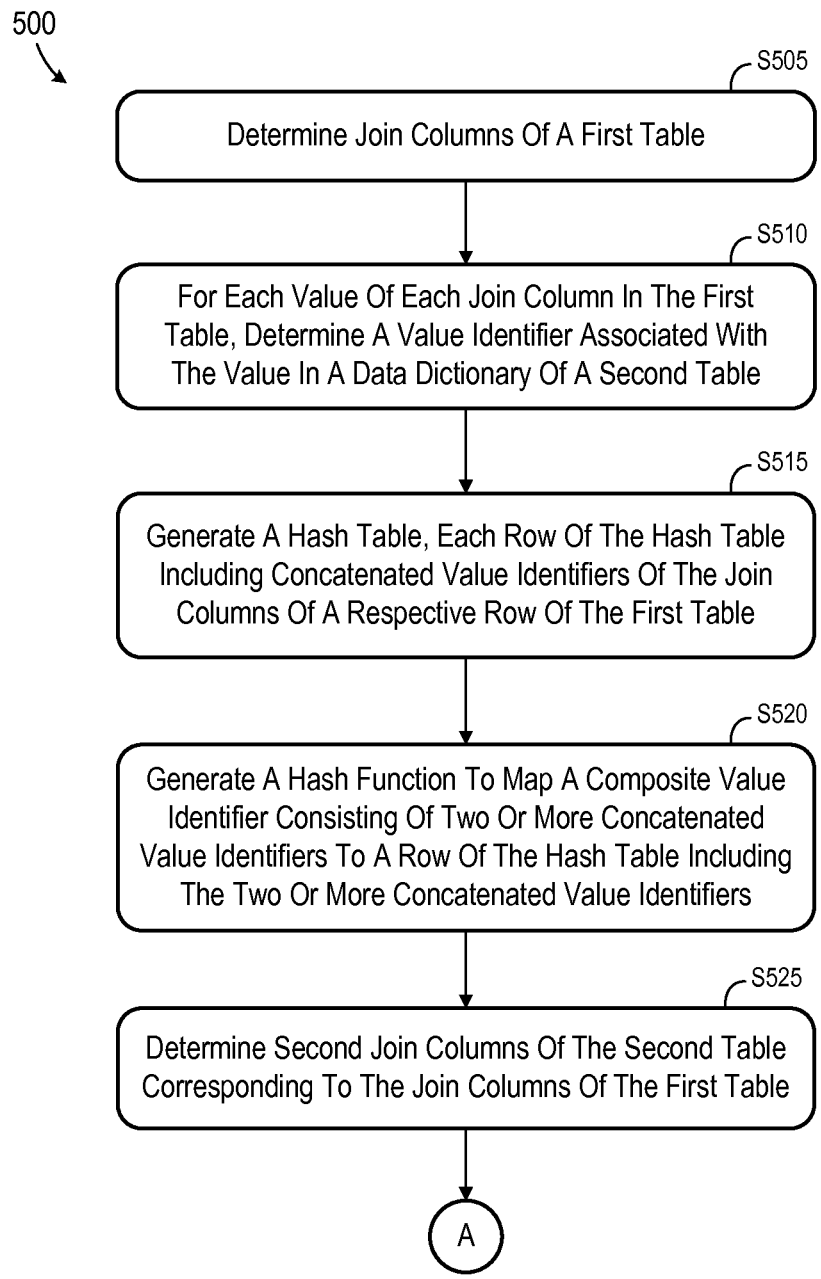
FIGS. 5a and 5b comprise a flow diagram of a process according to some embodiments.
Figure 5B:
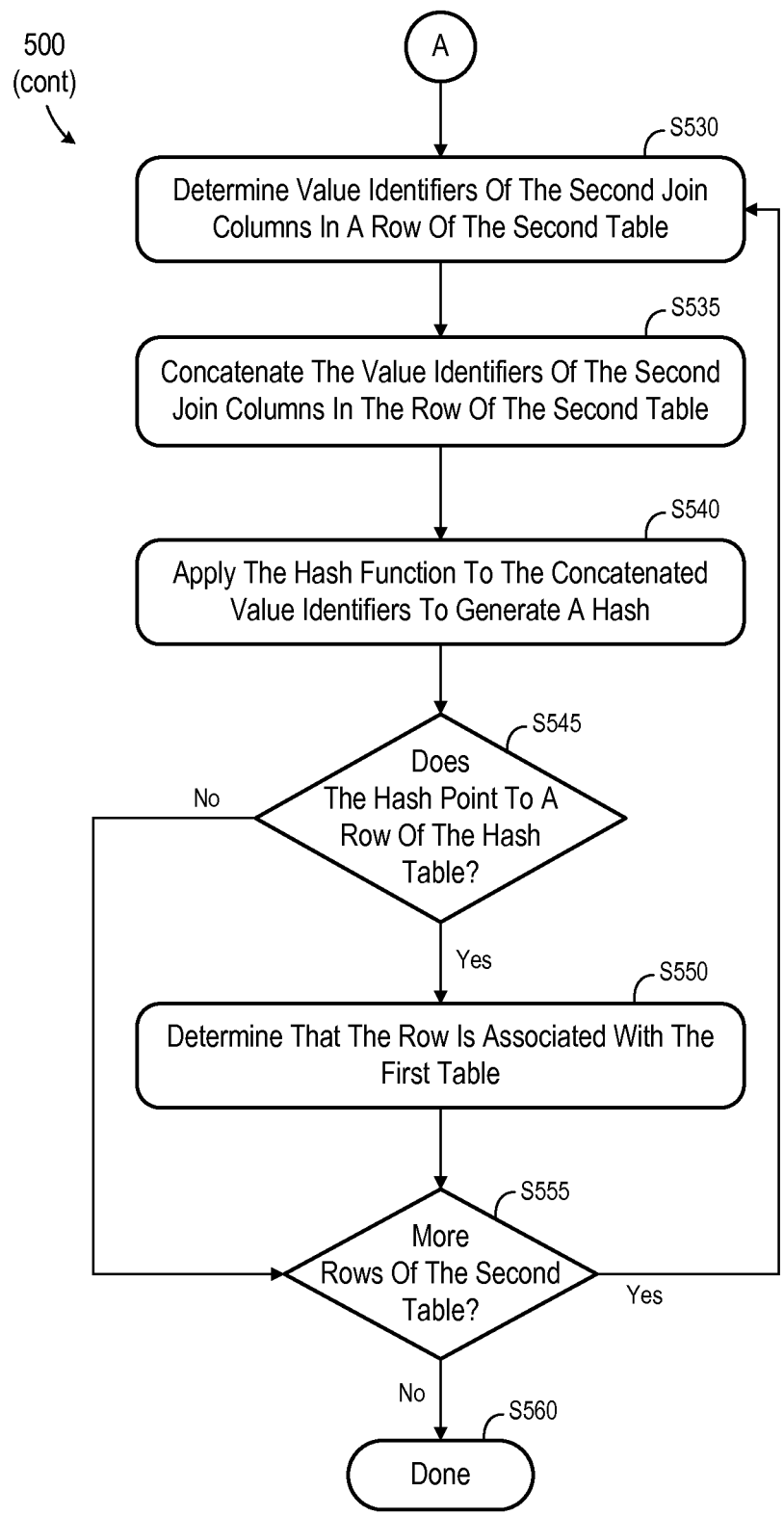

Process 500 of FIGS. 5a and 5b may be executed to determine entries of one table which are associated with entries of another table. Accordingly, process 500 is not limited to the context described above, Conversely, process 300 need not utilized process 500 during execution of S350.

JOIN columns of a first table are determined at S505. The JOIN columns define attributes which are used to determine associated rows of a second table. For example, if values of the JOIN columns within a row of the first table are "a" and "b", then all rows of the second table for which the JOIN columns include the values "a" and "b" are considered to be associated with the first table.

Next, at S510, for each value of each JOIN column in the first table, a value identifier is determined. The value identifier is associated with the value in a data dictionary of a second table.

Figure 6:
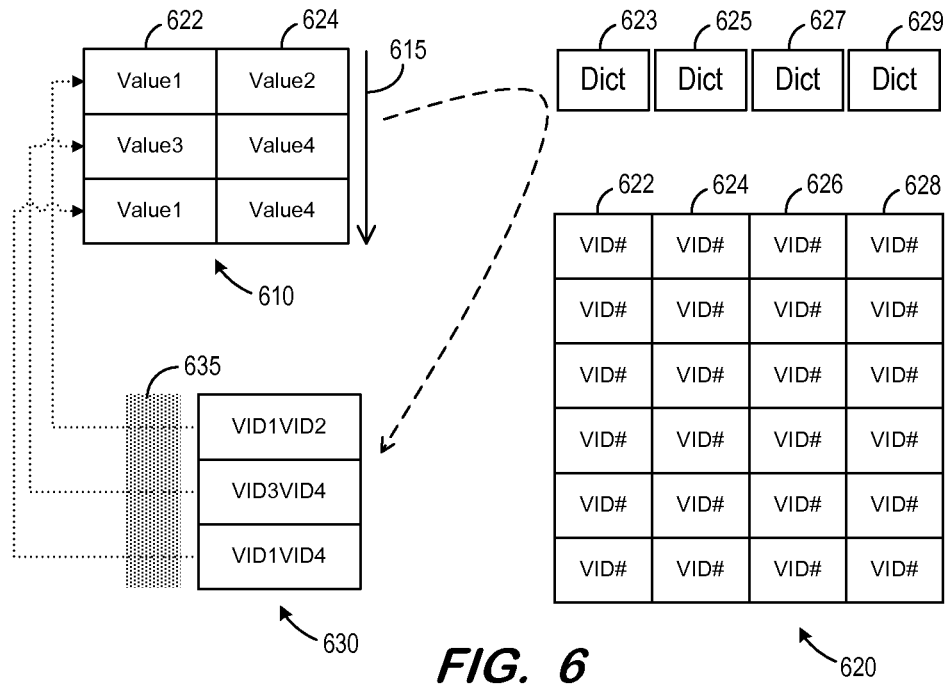
FIG. 6 illustrates a build phase of a hash join operation according to some embodiments.

FIG. 6 illustrates S510 according to some embodiments. Table 610 is the first table and table 620 is the second table. With reference to the above example of process 300, table 610 may be itab 423 and table 620 may be mytab of data server 410.

Table 610 includes JOIN columns 612 and 614. Each row of JOIN columns 612 and 614 includes a value. According to some embodiments, table 620 includes columns 622, 624, 626 and 628. Embodiments are of course not limited to two columns and four columns, respectively.

Each row of columns 622, 624, 626 and 628 stores a value identifier. Each of columns 622, 624, 626 and 628 is associated with a respective dictionary 623, 625, 627 and 629. Each dictionary specifies values which are associated with the value identifiers of its respective column. That is, dictionary 623 specifies a value for each value identifier in columns 622, dictionary 625 specifies a value for each value identifier in columns 624, etc. Value identifiers, rather than values, are stored in order to reduce the amount of memory required for table 620. Some embodiments may employ a single dictionary which includes associations between value identifiers and values which might be present in two or more columns of table 620.

Therefore, S510 includes determining a value identifier for each value of table 610, based on dictionaries 622, 624, 626 and/or 628. In the present example, it will be assumed that column 612 corresponds to column 622 and column 612 corresponds to column 624. Accordingly, value identifiers associated with the values of column 612 are determined based on dictionary 622 and value identifiers associated with the values of column 614 are determined based on dictionary 624.

A hash table is generated at S515. Each row of the hash table includes concatenated value identifiers of the join columns of a respective row of the first table. For example, each row of hash table 630 of FIG. 6 includes value identifiers associated with the values within the JOIN columns of a respective row of table 610. S510 and S515 may be performed iteratively, with a first row of hash table 630 being created after determining value identifiers for a first row of table 610 based on dictionaries 623 and 625, then continuing with a next row of table 610 as depicted by arrow 615.

A hash function is generated at S520. The hash function maps a composite value identifier consisting of two or more concatenated value identifiers to a row of the hash table which includes the two or more concatenated value identifiers. In one embodiment, hash function 635 maps each of the concatenated value identifiers of table 630 to an index pointing to a row of table 615.

At S525, second join columns of a second table which correspond to the join columns of the first table are determined. In the present example, this determination was made during S510, but it might be made at S525 in the absence of a one-to-one correspondence between data dictionaries and columns of table 620.

Figure 7:
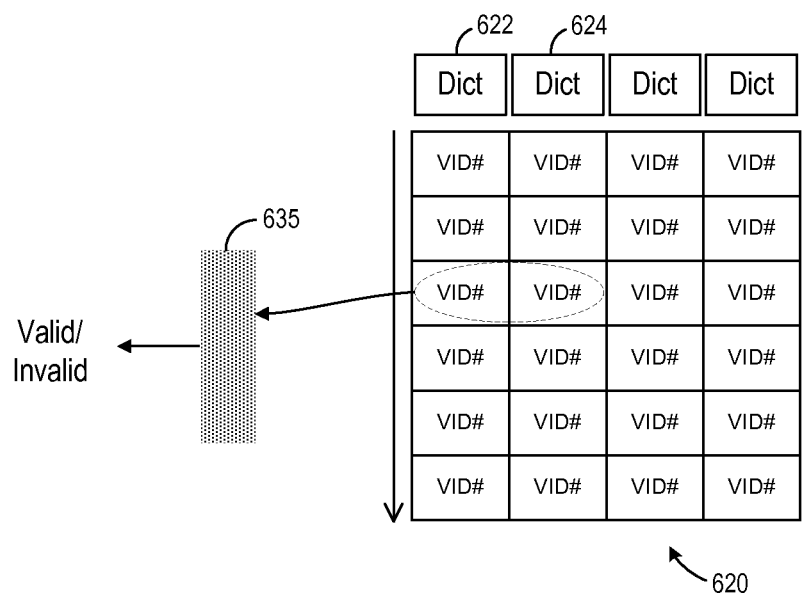
FIG. 7 illustrates a probe phase of a hash join operation according to some embodiments.

Value identifiers of the second join columns in a row of the second table are determined at S530. FIG. 7 illustrates the determination of two value identifiers of columns 622 and 624 at S530. The value identifiers are concatenated at S535. Some embodiments employ a Concat attribute to expedite the determination and concatenation at S530 and S535.

As further illustrated in FIG. 7, hash function 635 is applied to the concatenated value identifiers at S540 to generate a hash. At S545, it is determined whether the hash is valid (i.e., whether the hash points to a row of table 610). If not, it can be assumed that the associated row of the second table is not associated with the first table and flow proceeds to S555. At S555, it is determined whether the second table includes additional rows which have not been processed. If so, flow returns to S530 to determine value identifiers of a next row of the second table.

If the hash is determined to be valid at S545, it is determined at S550 that the row of the second table is associated with the first table. Accordingly, the row is flagged or otherwise noted for further processing after the completion of process 500. Flow then continues to S555.

Process 500 terminates once all rows of the second table have been processed. At this point, all rows of the second table which include the column values specified by one or more rows of the first table have been identified.

According to some embodiments, the rows of the second table may be partitioned and separate execution elements (e.g., processors, threads, cores, etc.) may execute S530 through S560 with respect to one or more partitions in parallel.

Figure 8:
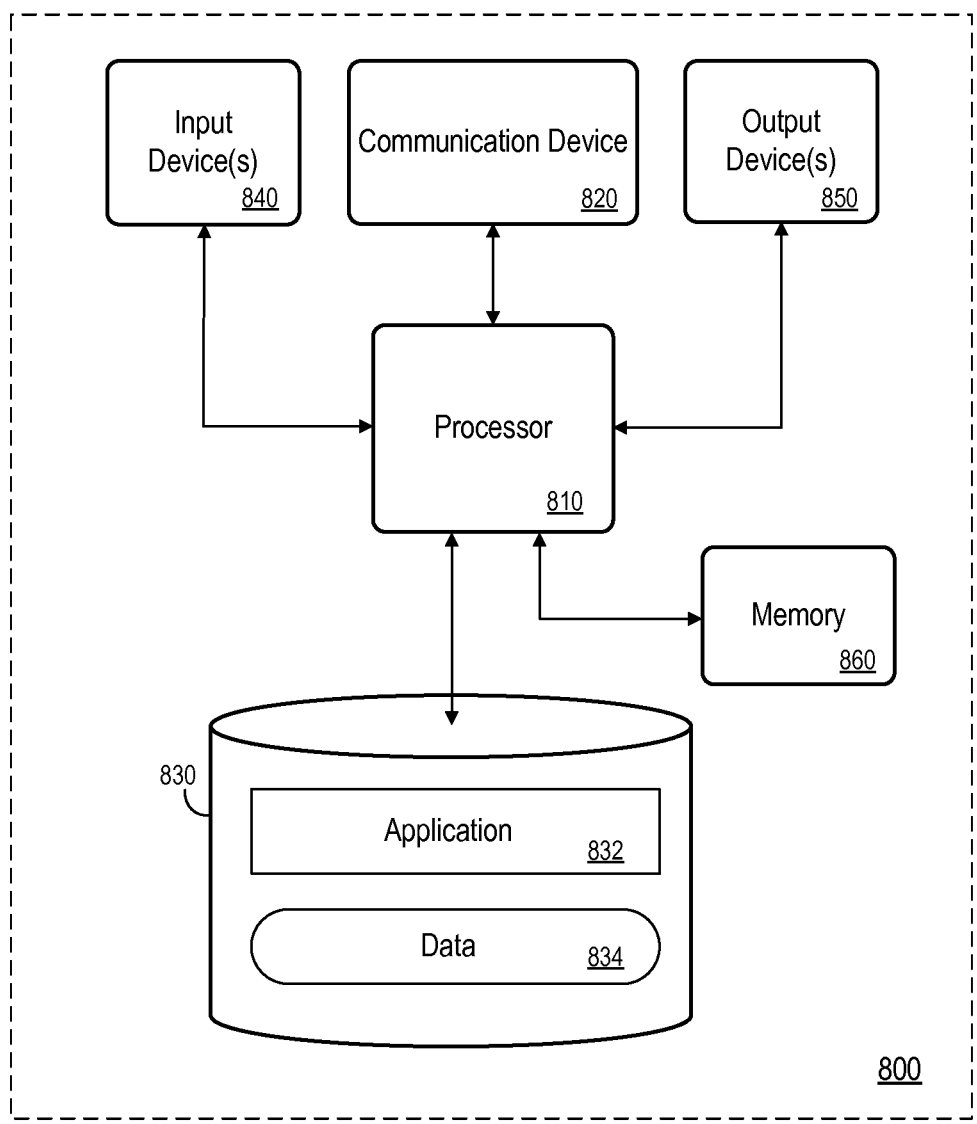
FIG. 8 is a block diagram of an apparatus according to some embodiments.

FIG. 8 is a block diagram of apparatus 500 according to some embodiments. Apparatus 800 may comprise a general-purpose computing apparatus and may execute program code to perform any of the functions described herein. Apparatus 800 may comprise an implementation of data server 210, client 220, or both according to some embodiments. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Application 832 may comprise program code executed by processor 810 to cause apparatus 800 to perform any one or more of the processes, or portions thereof, described herein. Embodiments are not limited to execution of these processes by a single apparatus. Data may include conventional database data as described above. As also described above, database data (either cached or a full database) may be stored in volatile memory such as memory 860. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 200 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a first device comprising:
a first volatile memory; and
a first processor to execute processor-executable program code in order to cause the first computing device to:
generate a query to retrieve, from a first database table, a result set conforming to query parameters for all entries of a second table stored in the volatile memory; and
serialize the second table into the volatile memory; and
a second device comprising:
a second volatile memory; and
a second processor to execute processor-executable program code in order to cause the second computing device to:
receive the serialized second table in the second volatile memory;
de-serialize the serialized second table into the second volatile memory;
determine a plurality of entries of the first database table which are associated with the second table;
determine the result set from the plurality of entries based on the query parameters;
wherein determination of the plurality of entries of the first database table which are associated with the second table comprises:
determining JOIN columns of the second table;
determining a value identifier for each value in the JOIN columns, based on a data dictionary of the first database table;
generating a hash function mapping concatenated value identifiers of each row of the second table to a row of the second table;

applying the hash function to concatenated value identifiers of a row of the first database table, the concatenated value identifiers stored in columns of the first database table corresponding to the JOIN columns;
determining whether the output of the hash function is a valid hash; and
if it is determined that the output of the hash function is a valid hash, determining that the row of the first database table is an entry of the first database table which is associated with the second table.

2. The system according to claim 1, the second processor to further execute processor-executable program code in order to cause the second computing device to:
copy the result set into the first volatile memory.

3. The system according to claim 1, the first processor to further execute processor-executable program code in order to cause the first computing device to:
create a third table in the first volatile memory, the third table including the result set.

4. A method comprising:
generating a query to retrieve, from a first database table, a result set conforming to query parameters for all entries of a second table stored in a volatile memory of a query client;
serializing the second table into the volatile memory;
copying the serialized second table into a second volatile memory of a data server;
de-serializing the serialized second table into the second volatile memory;
determining a plurality of entries of the first database table which are associated with the second table;
determining the result set from the plurality of entries based on the query parameters;
wherein determining the plurality of entries of the first database table which are associated with the second table comprises: determining JOIN columns of the second table;
determining a value identifier for each value in the JOIN columns, based on a data dictionary of the first database table;
generating a hash function mapping concatenated value identifiers of each row of the second table to a row of the second table;
applying the hash function to concatenated value identifiers of a row of the first database table, the concatenated value identifiers stored in columns of the first database table corresponding to the JOIN columns;
determining whether the output of the hash function is a valid hash; and
if it is determined that the output of the hash function is a valid hash, determining that the row of the first database table is an entry of the first database table which is associated with the second table.

5. The method according to claim 4, further comprising:
creating a third table in the first volatile memory, the third table including the result set.

6. A non-transitory computer-readable medium storing processor-executable program code, the program code executable to cause a computing device to:
generate a query to retrieve, from a first database table, a result set conforming to query parameters for all entries of a second table stored in a volatile memory of a query client; serialize the second table into the volatile memory;
copy the serialized second table into a second volatile memory of a data server; de-serialize the serialized second table into the second volatile memory;
determine a plurality of entries of the first database table which are associated with the second table;
determine the result set from the plurality of entries based on the query parameters;
wherein determination of the plurality of entries of the first database table which are associated with the second table comprises:
determination of JOIN columns of the second table;
determination of a value identifier for each value in the JOIN columns, based on a data dictionary of the first database table;
generation of a hash function mapping concatenated value identifiers of each row of the second table to a row of the second table;
application of the hash function to concatenated value identifiers of a row of the first database table, the concatenated value identifiers stored in columns of the first database table corresponding to the JOIN columns;
determination of whether the output of the hash function is a valid hash; and
if it is determined that the output of the hash function is a valid hash, determination that the row of the first database table is an entry of the first database table which is associated with the second table.

* * * * *